P. V. YOURL.
TIRE ARMOR.
APPLICATION FILED APR. 14, 1919.
1,347,982.
Patented July 27, 1920.
2 SHEETS—SHEET 1.
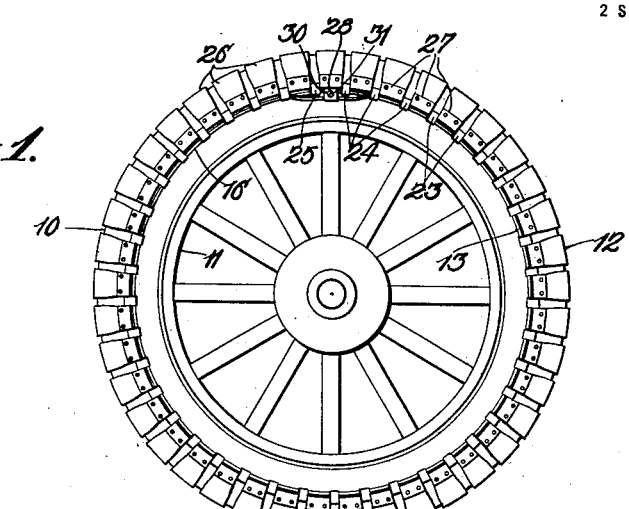
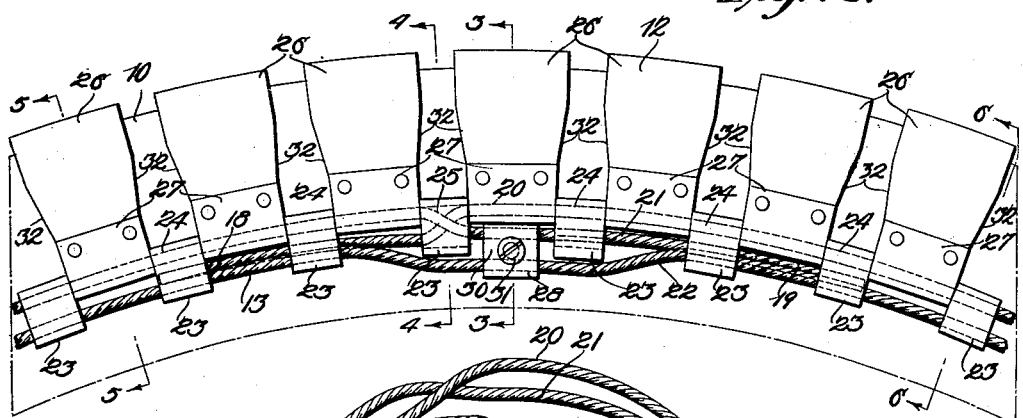
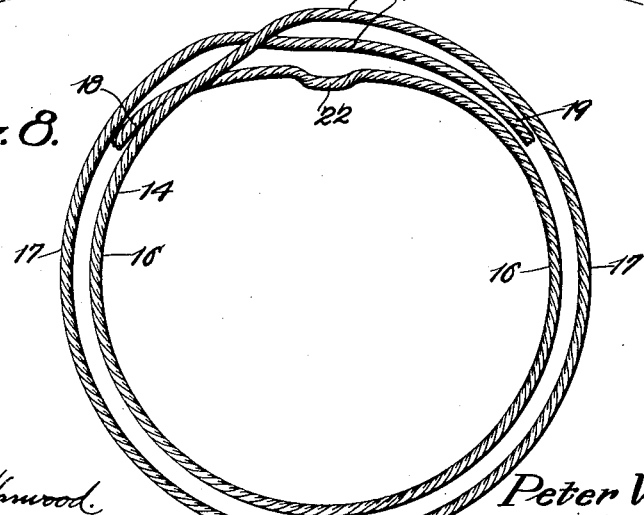

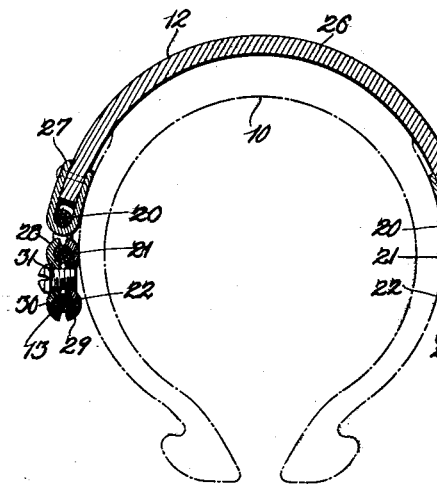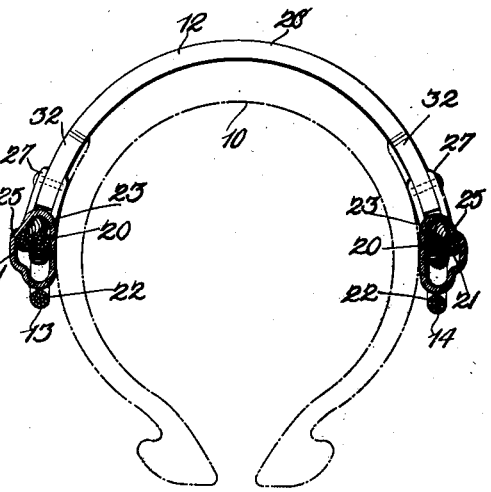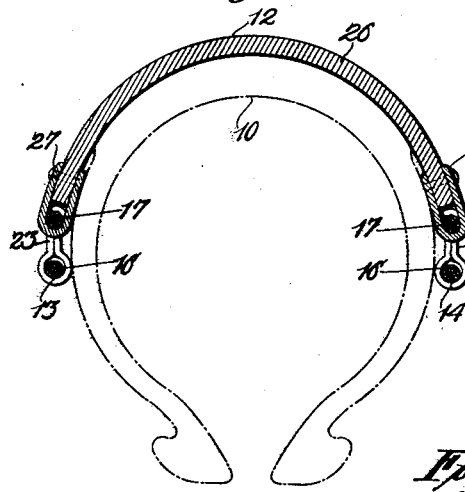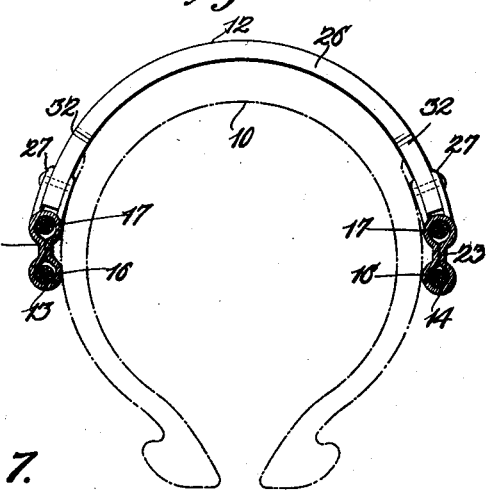

UNITED STATES PATENT OFFICE.

PETER V. YOURL, OF PHILADELPHIA, PENNSYLVANIA.

TIRE-ARMOR.

1,347,982.     Specification of Letters Patent.     Patented July 27, 1920.

Application filed April 14, 1919. Serial No. 289,903.

*To all whom it may concern:*

Be it known that I, PETER V. YOURL, a citizen of the United States, residing at Philadelphia, in the county of Philadelphia and State of Pennsylvania, have invented certain new and useful Improvements in Tire-Armors, of which the following is a specification.

One object of my invention is to provide a tire armor which can be easily and quickly attached to vehicle wheel tires and which will be so constructed that it will prolong the life of a tire upon which it is placed. In view of this qualification my invention is well adapted for use on tires which have been practically worn out and which could not otherwise be used with assurance against blow outs or punctures.

Another object is to make my invention durable and of a simple construction and so that it can be quickly and cheaply manufactured.

These objects, and other advantageous ends which will be described hereinafter, I attain in the following manner, reference being had to the accompanying drawings in which—

Figure 1 is a side elevation of a vehicle wheel and tire having my invention thereon, Fig. 2 is an enlarged fragmentary view of a portion of my invention showing its relation to a resilient tire, said tire being illustrated in dot-and-dash lines, Fig. 3 is a section taken on the line 3—3 of Fig. 2, Fig. 4 is a section taken on the line 4—4 of Fig. 2, Fig. 5 is a section taken on the line 5—5 of Fig. 2, Fig. 6 is a section taken on the line 6—6 of Fig. 2, Fig. 7 is a plan view of one of the ground engaging looped straps which forms a part of my invention, and Fig. 8 is an elevational view of a coiled wire strand cable or rope which forms a part of my invention.

Referring to the drawings, 10 represents a resilient tire, and as shown in Fig. 1, 11 represents the wheel upon which the tire is mounted. My invention consists of an armor 12 including two cables 13 and 14 each of which is coiled, as shown in Fig. 8 and adapted to be arranged so as to be located adjacent the sides of the tire 10; the coils of cable being of less diameter than the extreme outer diameter of the tire 10 but of greater diameter than the inner diameter of said tire. The cables 13 and 14 are preferably made of a number of twisted wire strands so as to render the cable extremely flexible but of great strength. As illustrated, each of the cables 13 and 14 includes two substantially continuous coils 16 and 17 which have their end portions 18 and 19 overlapping each other. By this arrangement, the coil 16 is of less diameter than the coil 17. Furthermore, adjacent the portions where the coils overlap there are three convolutions 20, 21 and 22, as clearly shown in Figs. 2, 3, 4 and 8. The several convolutions and coils 16 and 17 extend through bands 23, said bands being preferably made by cutting short lengths of seamless metallic tube and indenting their sides. In other words, the coils and convolutions of the cables 13 and 14 are threaded or extend through the bands 23, so that said bands prevent the separation of the coils and convolutions of the cables beyond a predetermined extent. Certain of the bands 23, such for example as those specifically designated by the reference character 24 (see Fig. 2) are of such cross section as to permit of all three of the convolutions 20, 21 and 22 to extend therethrough. The band 23 which is specifically designated by the reference character 25 is of such cross section as to permit the crossing of the convolutions 20 and 21 therein, as clearly shown in Figs. 2 and 4.

Flexible ground-engaging straps 26, which are preferably made of leather have loops 27 firmly secured to their opposite ends, said loops having portions of the outer coils of the cables 13 and 14 extending therethrough. The straps 26 and 27 are spaced apart throughout the entire circumference of the tire 10, and the bands 23 are respectively interposed between the loops 27, as clearly shown in Figs. 1 and 2.

Clamps 28 are provided and each of these clamps consists of two plates 29 and 30 which are held together by a clamping screw 31. The plates 29 and 30 form jaws which embrace the convolutions 21 and 22 of the cables 13 and 14 and thereby prevent relative movement of the convolutions 21 and 22 of the cables 13 and 14. By thus securing the convolutions of the cables, the coils 16 and 17 will be prevented from either increasing or decreasing their diameters and the armor will be confined upon the tire. By loosening the clamping screws 31, however, it is possible to vary the diameters of the coils 16 and 17 and thereby loosen or tighten the armor. Or if desired, the coils 16 and 17 can be increased to such diameter as to permit the armor to be removed from the tire.

The bands 23 provide spacing means for the loops 27 and straps 26 so that the latter mentioned elements are always held in a certain relation to each other. However, they can move slightly in the direction of the circumference of the tire or the entire device can move circumferentially of the tire. The clamps 28, as clearly shown in Figs. 1 and 2, are positioned between two bands 23 and therefore limit the circumferential movement between the bands, straps and cables to the distance between the side edges of the clamps and the adjacent edges of the bands 23 in the construction as illustrated. Furthermore, the loops 27 are free to swing on the outer coils and convolutions of the cables and thereby permit the necessary flexing of the tire when used upon a vehicle so as to take up shock caused by the vehicle moving over the roadway.

Each of the straps 26 is preferably beveled or scarfed, as shown at 32 so that the central portions of the straps can be made of greater width than the portions to which the loops 27 are attached. Thus an extended ground-engaging surface is provided and at the same time the bands 23 can be made sufficiently wide to properly house the respective convolutions and coils of the cables.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a number of flexible members having loops formed at their ends; means for securing said members across the tread of a tire and including a cable; bands interposed between said members and having portions positioned closer to the axis of the tire than said loops and other portions in alinement with said loops, said cable having a plurality of complete coils, one of said coils of the cable extending continuously through the alined portions of said band and loops, another of said coils extending continuously through said first mentioned portions of the bands; and means for fastening the ends of the cable; substantially as described.

2. A device of the character described including a number of flexible members having loops formed at their ends; means for securing said members across the tread of a tire and including a cable; bands interposed between said members and having portions positioned closer to the axis of the tire than said loops and other portions in alinement with said loops, said cable having a plurality of complete coils, one of said coils of the cable extending continuously through the alined portions of said band and loops, another of said coils extending continuously through said first mentioned portions of the bands, the ends of said cable being overlapped; and clamping means for securing said overlapped ends of the cable together, the ends of the cable being overlapped to such extent as to permit the coils to be increased to a size sufficient to permit said members to be removed from the tire without pulling the cable entirely out of the loops or bands; substantially as described.

In testimony whereof I have signed my name to this specification in the presence of two subscribing witnesses.

PETER V. YOURL.

Witnesses:
 CHAS. E. POTTS,
 AUGUSTUS B. COPPES.